United States Patent [19]

Koss et al.

[11] Patent Number: 4,853,018

[45] Date of Patent: Aug. 1, 1989

[54] METHOD AND APPARATUS FOR FORMING A GLASS SHEET

[75] Inventors: George A. Koss, Dearborn Heights; Gary W. Sitzman, Detroit, both of Mich.

[73] Assignee: Ford Motor Company, Dearborn, Mich.

[21] Appl. No.: 249,811

[22] Filed: Sep. 27, 1988

Related U.S. Application Data

[63] Continuation-in-part of Ser. No. 124,189, Nov. 23, 1987, abandoned, Ser. No. 124,190, Nov. 23, 1987, abandoned, Ser. No. 124,240, Nov. 23, 1987, abandoned, and Ser. No. 124,317, Nov. 23, 1987, abandoned.

[51] Int. Cl.⁴ .................... C03B 11/07; C03B 23/035
[52] U.S. Cl. ........................................ 65/94; 65/106; 65/107; 65/182.2; 65/268; 65/273; 65/290; 65/291
[58] Field of Search ................ 65/64, 90, 92, 94, 102, 65/106, 107, 182.2, 258, 260, 268, 273, 289, 290, 291, 361

[56] References Cited

U.S. PATENT DOCUMENTS

| | | | |
|---|---|---|---|
| 4,202,681 | 5/1980 | McMaster et al. | 65/104 |
| 4,229,199 | 10/1980 | Seymour | 65/106 |
| 4,349,374 | 9/1982 | Rupp | 65/107 |
| 4,378,988 | 4/1983 | Presta | 65/182.3 |
| 4,437,871 | 3/1984 | McMaster et al. | 65/104 |
| 4,483,702 | 11/1984 | Frank et al. | 65/273 |
| 4,711,653 | 12/1987 | Frank et al. | 65/106 |
| 4,711,654 | 12/1987 | Iida | 65/106 |

*Primary Examiner*—Robert L. Lindsay
*Attorney, Agent, or Firm*—Peter D. McDermott; Roger L. May

[57] ABSTRACT

This invention is directed to a method and apparatus for forming a glass sheet with differential gas pressure over opposite surfaces thereof. The glass sheet is formed by the action of differential gas pressure over a forming area located on a curved exterior surface of a rotatable glass former. The forming area moves on an arcuate path about an axis of rotation of the glass former. The glass sheet forming operation is carried out in an incremental manner by rotational contact of the forming area of the glass former and the glass sheet being formed. Full dimensional control can be achieved, whereby glass sheets may be produced which are substantially identical copies of one another.

25 Claims, 9 Drawing Sheets

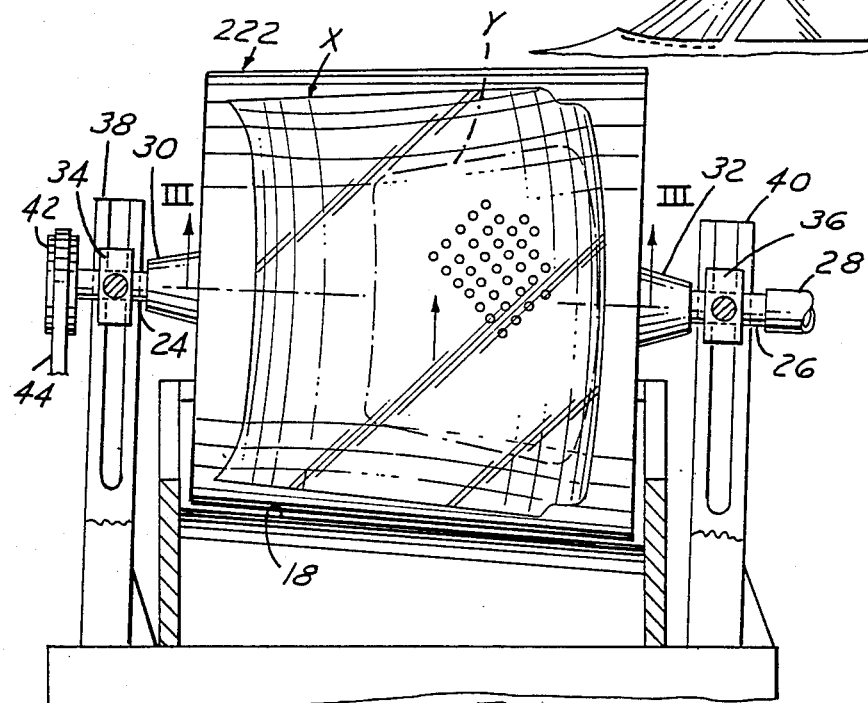
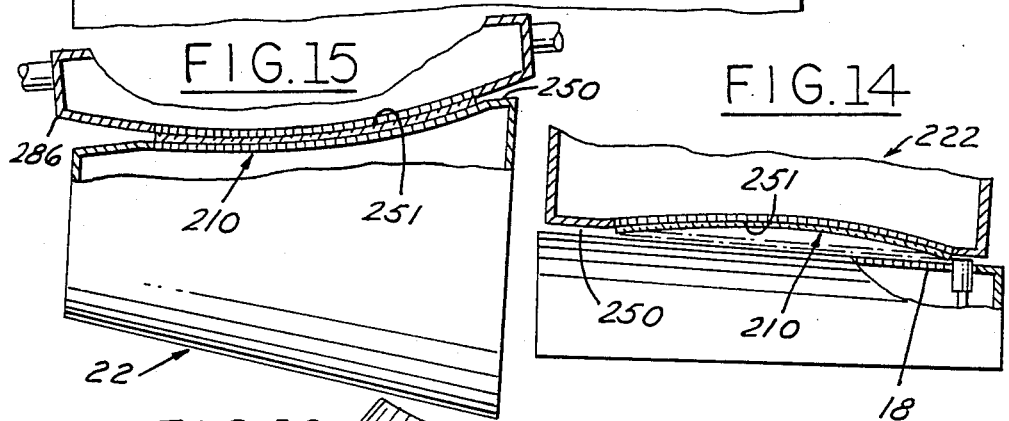
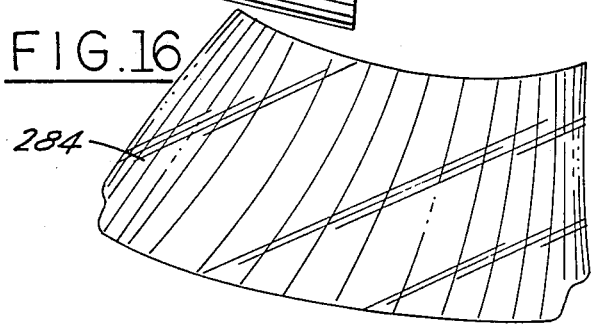

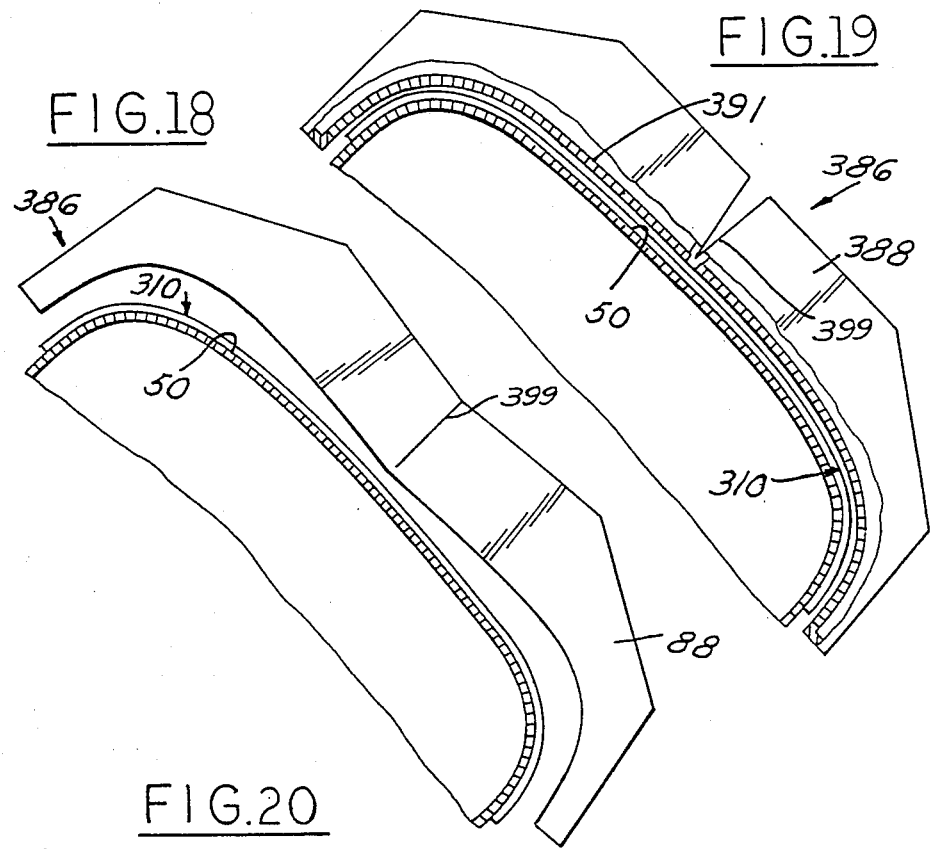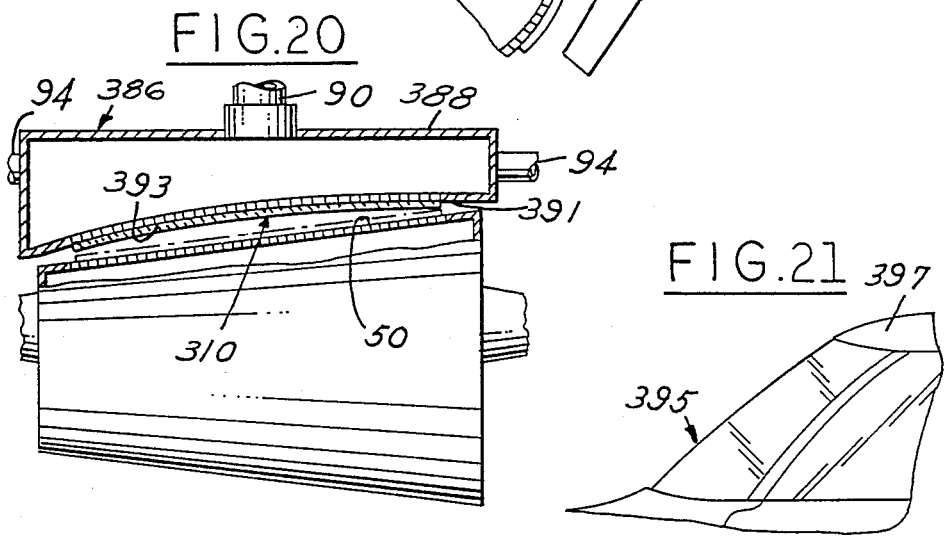

METHOD AND APPARATUS FOR FORMING A GLASS SHEET

This is a continuation-in-part of application Ser. Nos. 124,189 filed Nov. 23, 1987; 124,190 filed Nov. 23, 1987; 124,240 filed Nov. 23, 1987; and 124,317 filed Nov. 23, 1987 all now abandoned.

BACKGROUND OF THE INVENTION

1. Field of the Invention

This invention relates to a method and apparatus for forming a glass sheet and, more particularly, to a method and apparatus wherein forming occurs while the glass sheet is being transported on a rotating forming surface.

2. Description of the Related Art

In the art of forming glass sheets into finished products of complex shape, there are few known methods of transporting the glass sheet to and through a forming or shaping operation after it has been heated to the softening point, i.e., to a temperature sufficiently high that it may be formed.

A first known manner of transporting a heated glass sheet is by gripping an upper edge thereof with tongs. This method leaves marks in the upper edge of the glass sheet and generally does not work well on a relatively thin glass sheet.

A second method of transporting a heated glass sheet is on a metal ring which engages the periphery of the glass sheet. This transportation method tends to leave marks along the edges of the glass sheet. There is also no full, direct surface dimensional control of the shape of the formed glass sheet if the glass sheet remains supported by the metal ring during a shaping operation, because the ring contacts only the periphery of the glass.

A third method of transporting a heated glass sheet during a shaping operation is on a cushion of gas, such as in the well known "Gas Hearth" process, which is used typically only for bending a glass sheet into a cylindrical form. For other than cylindrical forms, the glass sheet is picked up from the air cushion and moved against a suitable shaping mold.

A fourth method of transporting a heated glass sheet is on ceramic rolls. Once again, some device must be used to pick the glass sheet up from the ceramic rolls and bring it into contact with a suitable forming die in order to form it into a product having a complex shape. Transportation of glass sheet on ceramic rolls generally is acceptable for a glass product which is to be used as a side lite for an automobile, for example. This method is not known to work satisfactorily, however, for the production of a windshield quality glass product or for a relatively thin glass product.

In all except the second method mentioned above to be known in the art for transporting a heated glass sheet in a glass shaping operation, the glass sheet is stopped in its transportation path and thereafter moved into engagement with some type of forming equipment. Thus, there is an interruption in the glass forming process which adds time, complexity and cost to the forming process. One complexity added by stopping the glass sheet is the need to determine or at least estimate the degree of cooling of the glass during the stop and to compensate for such cooling in the heating of the glass sheet.

It is an object of this invention to provide a method and apparatus for forming a glass sheet in which the sheet can be formed while continuously in motion from a heating operation through the forming operation. It is another object of this invention that forming of a glass sheet be carried out concurrently with the transportation of that glass sheet toward the end of a glass processing line. It is a further object of this invention, according to certain preferred embodiments, to provide a method and apparatus for forming a glass sheet with dimensional control over the entire surface area thereof.

These and other objects and features of the invention will be better understood in the light of the following disclosure and discussion thereof.

SUMMARY OF THE INVENTION

According to a first aspect of the invention, a method is provided for forming a glass sheet from a first condition into a second condition, the glass sheet having a selected thickness with first and second surfaces and having a selected peripheral configuration defining a peripheral edge. The forming method of the invention comprises the steps of:

heating the glass sheet to a temperature at which it is formable from the first condition into the second condition;

conveying the heated glass sheet by conveying means at a selected velocity along a path of travel to a forming station comprising a rotatable glass former including means defining an outer peripheral forming surface having at least a portion thereof with a defined shape substantially corresponding to the second condition of the glass sheet, the outer peripheral forming surface being in communication with a source of reduced pressure, wherein a leading edge of the glass sheet is brought into registered contact with a leading portion of the peripheral forming surface while the peripheral forming surface is being rotated by rotating means about an axis substantially transverse to the path of travel at a peripheral velocity substantially equivalent to the aforesaid selected velocity of travel of the glass sheet; and Progressively moving the first surface into close proximity with the defined shape portion of the outer peripheral forming surface by cooperation of the conveying means, the rotating means and the reduced pressure source, the glass sheet there being transformed into the second condition at least in part by external flid pressure acting against the second surface of the glass sheet while reduced pressure acts against the first surface and while the peripheral forming surface continues rotating.

According to a second aspect of the invention an apparatus is provided for forming a glass sheet, as above, from a first condition into a second condition. The apparatus comprises, in combination, means for conveying the glass sheet at a selected velocity along a path of travel from a first position to a second position, the peripheral edge on the glass sheet having a leading edge portion while moving along the path of travel, means for treating the glass sheet, while being conveyed, so as to be formable while at the second position, means at the second position for forming the glass sheet into the second condition, such forming means including means defining an outer peripheral surface having at least a portion thereof with a defined shape substantially equivalent to the second condition of the glass sheet, means for rotating the outer peripheral surface about an axis transverse to the path of travel and at a peripheral velocity substantially equivalent to the selected velocity of the conveying means, the peripheral surface having a leading position during rotation, the conveying means conveying the leading edge portion of the glass sheet into registered contact with such leading position of the peripheral surface, the forming means including means communicating with a reduced pressure source and with the defined shape portion of the peripheral surface for causing the glass sheet to transfer along its first surface from the conveying means to the defined shape portion as a result of external pressure acting against the second surface while the aforesaid reduced fluid pressure acts against the first surface, the conveying means, rotating means and reduced pressure source cooperating for progressively moving the first surface of the glass sheet into close proximity with the defined shape portion of the outer peripheral surface of the forming means, the glass sheet being formed into the second condition while on the defined shape portion and while the forming means continues rotation.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference numerals indicate like parts throughout the several figures, and in which:

FIG. 1A is a more detailed view of a portion of the apparatus shown in FIG. 1;

FIG. 3 is an isometric view of the glass former and depicted thereon are again glass sheets of different sizes which can be formed individually, one at a time, on the glass former;

FIG. 12 is an elevation view corresponding to the view of FIG. 2, but of an alternative preferred embodiment of the invention, showing a rotatable glass former which has a glass forming outer peripheral surface, this figure showing in solid lines the formation of a large glass sheet and, as an alternative, in dotted lines the formation of a smaller glass sheet on the same glass former;

FIG. 14 is a cross-section view showing the pickup of a glass sheet by the glass former of FIG. 12;

FIG. 15 is a cross-section view showing the transfer of a glass sheet from the glass former of FIG. 12 to a device for removing the glass sheet from the glass former;

FIG. 16 is an isometric view of a glass sheet formed into a complex geometric shape by the glass former of FIG. 12;

FIG. 17 is a partial elevation view of the glass sheet of FIG. 16 installed as a windshield in a motor vehicle;

FIG. 18 is an enlarged elevation view of a device for removing the formed glass sheet from the glass former, which device is adapted to be a secondary glass former according to an alternative preferred embodiment of the invention;

FIG. 19 is an enlarged elevation view, partly in cross-section, of the secondary glass former of FIG. 18 in position to pick up the formed glass sheet for additional forming and transfer;

FIG. 20 is an elevation view, partly in cross-section, showing the additional forming of the glass sheet on the secondary glass former of FIG. 18;

FIG. 21 is a partial elevation view of a glass sheet formed into a complex geometric shape partially by the glass former of FIGS. 18-20, installed as a back lite in a motor vehicle;

DESCRIPTION OF PREFERRED EMBODIMENTS

Figure 1:
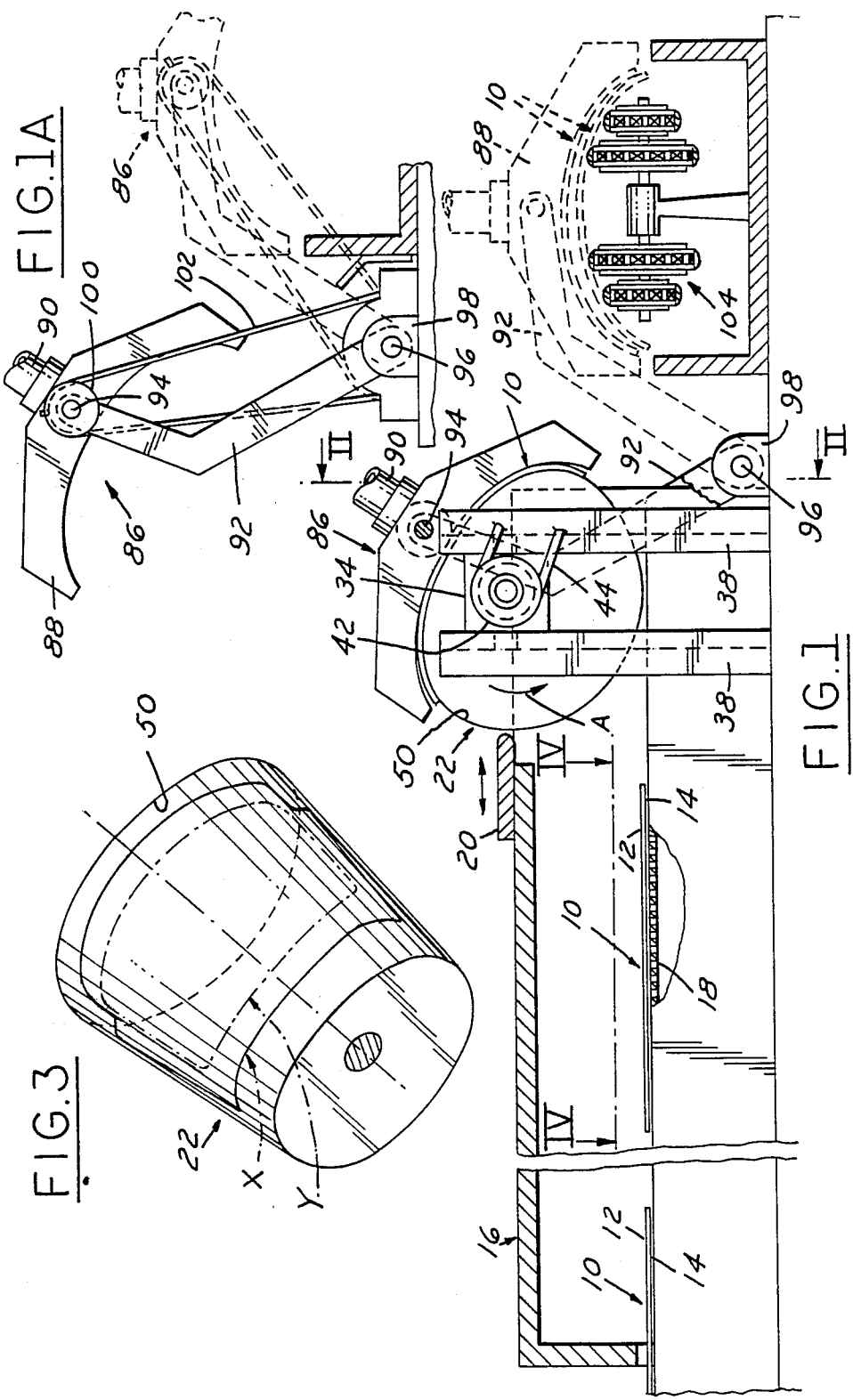
FIG. 1 is an elevation view in cross-section showing a schematic representation of an apparatus according to a preferred embodiment of the invention to produce a curved glass sheet.

To aid understanding of the invention, a brief overview is first set forth, followed by a more detailed discussion of the preferred embodiments. It should be understood in the following discussion that reference to a sheet of glass is intended to be a generic reference to a slab or template of glass prior to, during or after being processed in accordance with the present invention.

In accordance with the invention, a glass sheet is heated to a temperature at which it is formable by application of different gas pressures on opposite surfaces thereof. The heated glass sheet is conveyed on a path toward a forming area over which the heated glass sheet will be formed. While any suitable method and means may be used to heat the glass sheet and to transport it to the forming area, such as ceramic rolls, the preferred embodiments disclosed below employ gas hearth means to perform these functions in view of the better glass surface and optical qualities achieved thereby. Certain preliminary, simple glass forming can be performed by the heating and transport means according to known techniques.

The heated glass sheet is transported to a forming station comprising a glass former having a forming area located on a modified conical surface, specifically, a portion of an exterior surface of a rotatable drum or mandrel or the like. The forming area is moved on an arcuate path about an axis of rotation of the glass former. The term "glass former" will be used herein to refer both specifically to the rotating forming drum or mandrel or surface thereof and, more generally, to the glass forming station or process step. The portion of the glass former defining the forming area is sufficiently porous that a differential pressure may be established thereacross when a reduced pressure is applied, e.g., from the interior of the glass former. The differential pressure is established across the forming area.

A leading edge of the first surface of the heated glass sheet and a leading portion of the forming area are brought into registered contact with one another while both the aforementioned leading edge and the aforementioned leading portion are moving at the same velocity. Attachment of the glass sheet to the forming area is initiated because of the differential in pressure which is established between a portion of the forming area which engages the first surface of the glass sheet and the gas pressure, typically atmospheric or higher pressure, acting on the second surface of the glass sheet.

Concurrent movement of the forming area and the glass sheet is continued so that the entire length of the glass sheet is incrementally moved from its path of conveyance into attachment with the forming area. Different gas pressures are at that point still acting on the first and second surfaces of the glass sheet. In this manner, the glass sheet can be formed progressively with full dimensional control on the forming area of the glass former often, and preferably, by the use of differential gas pressure only. In an embodiment of the invention directed to making formed glass sheets for a motor vehicle windshield manufacturing operation, such as in preferred embodiments described below, a formed glass sheet is made having variable height and size, and any of various simple or complex geometric shapes for example that shape commonly called a "flattened cone" shape, an S-shape, a saddle shape, etc.

In accordance with preferred embodiments of the invention, rotation of the glass former is interrupted only briefly when the glass sheet has been completely formed on the forming area thereof by action of the differential gas pressure. The formed glass sheet is removed at that point from the glass former.

Describing preferred embodiments now in greater detail and referring first to FIG. 1, a plurality of elongate glass sheets 10, 10 are conveyed sequentially through a heating lehr, or furnace, generally designated by the numeral 16. Each glass sheet has a first surface 12 and a second surface 14. In the case of this preferred embodiment, the first surface is an upper surface of the glass sheet and the second surface is a lower surface of the glass sheet. The glass sheets are conveyed through the heating lehr by a gas float mechanism in which gas flowing through a porous surface 18 supports the glass sheets above that surface. The glass sheets are moved along the porous surface by means of an edge roller drive (not shown) engaging an edge of the glass sheet. Although other means, such as ceramic rolls, could be used within the scope of the invention to heat and convey the glass sheets, the gas float is much preferred since it reduces glass surface contact with other solid surfaces which could damage the optical quality of the glass sheet. The heating lehr also has a sliding roof portion 20, the purpose of which will be described hereinbelow. Such glass conveying and heating means are conventional in the art.

In the heating lehr 16, the glass sheet 10 is heated to a temperature at which the glass sheet is formable by application of different gas pressures on the first surface 12 and the second surface 14 thereof. The sheet typically is heated to a temperature in a range from 600° C. to 640° C. depending on the thickness of the glass sheet. When the glass is heated to a temperature in this range, the application of different pressures on the different surfaces thereof, the differential being in a range from 10 mm to 100 mm of water gauge, depending on thickness, usually will be sufficient to form the glass sheet into a desired configuration. Of course, it is apparent that the higher the temperature, the lower the differential in glass pressure required to form a heat softened glass sheet.

Figure 2:
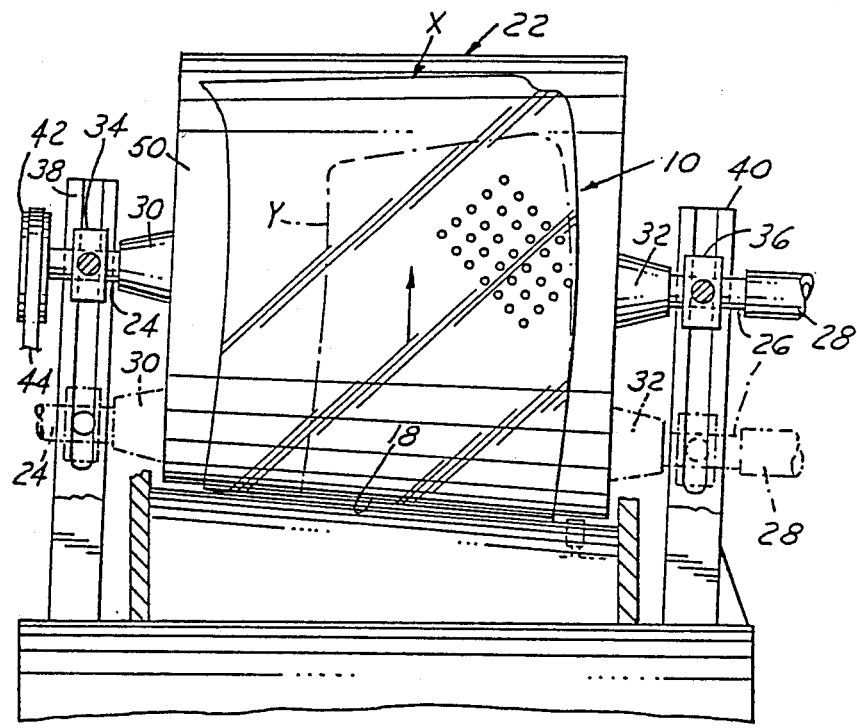
FIG. 2 is an elevation view taken along line II—II of FIG. 1 showing, in greater detail, a rotatable glass former which has a glass forming outer peripheral surface, this figure showing in solid lines the formation of a large glass sheet and, as an alternative, in dotted lines the formation of a smaller glass sheet on the same glass former.

The individual glass sheets 10 are conveyed toward a glass former, generally designated by the numeral 22. The glass former, which will be described in greater detail hereinbelow, and as may best be seen in FIG. 2, is mounted for rotation by means of a pair of shafts 24 and 26. The shaft 26 is hollow so that a vacuum line 28 may be attached thereto for a purpose to be described hereinbelow. The shafts are connected to trunnions 30 and 32, respectively, with the trunnion 32 also being hollow. The shafts 24 and 26 are mounted in sliding bearings 34 and 36, respectively, for both rotative and oscillating movement. Sliding bearings 34 and 36 are mounted for vertical up and down movement in paired guide posts 38—38 and 40—40, respectively.

As seen in FIG. 1, the glass former 22 is rotated by means of a pulley 42 mounted on the end of the shaft 24. The pulley in turn is rotated by a belt 44 driven by a suitable electric motor (not shown). The direction of rotation of the glass former in the preferred embodiment is in one direction only, that being in the direction of arrow A of FIG. 1. During this rotation, as different portions of the surface of the glass former are moved down toward the porous surface 18 of the heating lehr 16, the sliding bearings 34 and 36 will move vertically downward or upward as required in their associated guide posts 38—38 and 40—40 to accomplish the glass bending action which will be described below.

Figure 4:
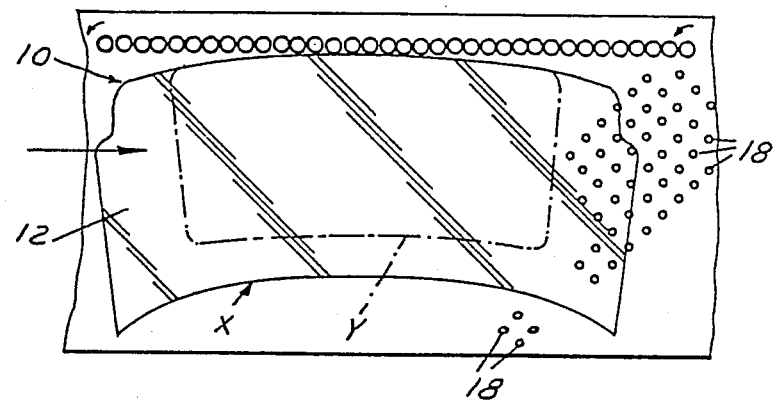
FIG. 4 is a plan view taken along the line IV—IV of FIG. 1 depicting in detail the conveying of a heated glass sheet toward the glass former.
Figure 5:
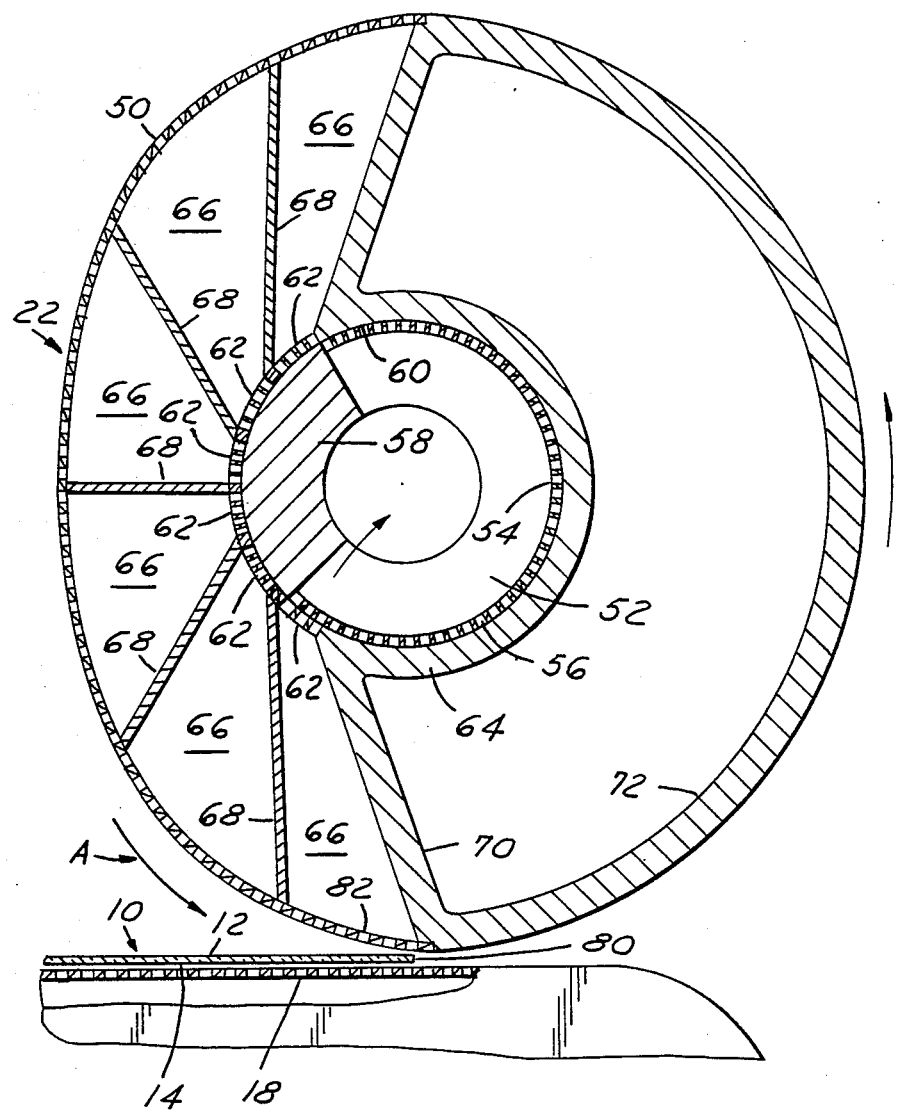
FIG. 5 is an enlarged elevation view in cross-section of the glass former.

The configuration of the glass former 22 is best understood by reference to FIGS. 3 and 5. Basically, the glass former defines a forming area 50 over which a glass sheet will be formed. As shown in outline form in FIG. 2, glass sheets of substantially different sizes but of similarly curved forms can be formed on the same glass former. One such shape is generally identified by the letter X and another such shape is generally identified by the letter Y. Glass sheets of these two shapes are shown also in FIG. 4 being conveyed on the porous surface 18 of the heating lehr in a direction toward the glass former. Thus, the glass former may be used to shape different configurations of glass, that is, larger and smaller configurations, so long as the desired radius of curvature for each formed glass sheet is the same. If different radii of curvature are required, a different modified conical drum would be used as the glass former. The conical drum of the glass former is designed and constructed as a separate and easily interchangeable unit so that it can be easily moved in and out of position. This interchangeability permits rapid tool change, a very significant advantage of the invention.

As best seen in FIG. 5, the forming area 50 of the glass former 22 is porous. Thus, a differential pressure may be applied across the forming area 50 by the establishment of a vacuum, i.e., a sub-atmosphereic pressure, in the interior of the glass former 22. The vacuum is established by drawing a vacuum on vacuum line 28 which in turn results in a vacuum being drawn on hollow shaft 26, the hollow trunnion 32, and the interior of a slide valve 52 shown in FIGS. 5 through 11. The slide valve consists of a stationary shutter 54 which comprises open shutter areas 56—56 and a closed shutter area 58. The interior of the glass former 22 then acts as a rotating slide valve 60 which has open valve areas 62—62 and a closed valve area 64.

With reference to FIG. 5, it is seen that there are six open valve areas 62—62 associated with the forming area 50 of the glass former 22. The six open valve areas define six independent vacuum chambers 66—66 which are separated from one another by partitiqn walls 68—68 and walls 70—70 connected to a wall segment with constant radius 72 which defines the nonforming area of the glass former. Although in FIG. 5 is shown six separate vacuum chambers, the interior of the glass former can similarly be divided, depending on need, into any number of independently activated or controlled vacuum chambers.

As shown in FIG. 5, with the glass former 22 rotating in the direction of arrow A of that FIG., a first open valve area 62 of a first vacuum chamber 66 has moved beyond the closed shutter area 58, thereby connecting the first vacuum chamber 66 to the source of vacuum. As additional rotation of the glass former takes place, additional open valve areas 62 are also moved beyond the closed shutter area 58 so that they also will be connected to the source of vacuum. The open arc of valve area 56 of the stationary slide valve member 54 is sufficient so that all of the open valve areas 62—62 may pass beyond the closed shutter area 58 of the stationary slide valve member 54 and thereby have all of the vacuum chambers 66—66 connected to the forming area 50 also connected to the vacuum source.

In operation, as may best be understood by reference to FIGS. 5 to 9, a heated glass sheet 10 is conveyed over the porous surface 18 of the heating lehr 16 on a path toward the forming area 50 of the gass former 22 over which the heated glass sheet will be formed. As has been described above, the forming area 50 is located on a modified conical surface formed on an exterior surface of the rotatable glass former 22. Consistent with an explanation given above in this regard, it should be understood that the term "glass former" is used herein both specifically in reference to the conical drum component and, more generally, in reference to that component in association with support means, vacuum and valve means, rotating means and like associated components, such as those described herein. When the conical drum of the glass former is rotated, the forming area moves on an arcuate path about the axis of rotation of the glass former. It can be seen that the axis of rotation is substantially transverse to the direction of travel of the glass sheet along surface 18 of the heating lehr.

Reference is now made to FIG. 5. In accordance with the teachings of the method of our invention, a leading edge 80 of the glass sheet 10 is brought into registered contact with a leading portion 82 of the forming area 50 of the glass former 22. The location on the surface of the conical drum at which the leading edge 80 of the glass sheet makes contact will effect the orientation and location of the entire glass sheet thereon. Thus, by registered contact is meant, generally, that the angular position of the glass former and the glass sheet are such that the glass sheet will be taken up into a preselected location on the conical drum. Typically, the center of the glass sheet will wind up in the center of the glass former during the glass forming operation. Different lengths of glass, of course, will cover different lengths of the forming area of the glass former. The shorter the glass sheet, the less forming area will be used, but the glass sheet still will be located centrally of that forming area. The exact registered contact may be assured by controlling the rate of rotation of the glass former as well as the rate of advancement of the glass sheet. Commercially available means for coordinated actuation and advancement of different components of forming and processing lines have long been well known to the skilled of the art and their application in and to the present invention will be readily apparent in view of the present disclosure.

Figure 6:
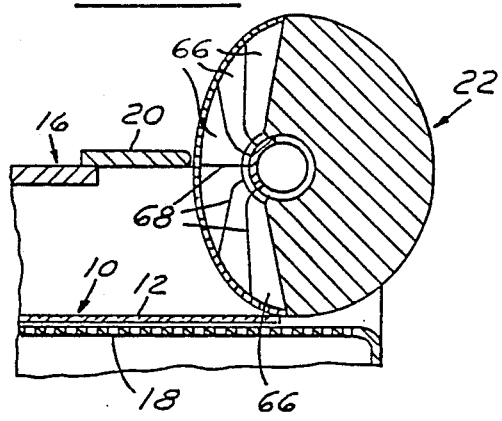
FIGS. 6 through 9 show the glass former in various positions while it is incrementally picking up and forming a heated glass sheet.

Again, with reference to FIG. 5, the leading edge 80 of the upper surface 12 of the glass sheet 10 is brought into registered contact with the leading portion 82 of the forming area 50 of the glass former. The forming surface should be rotating at the time of contact with the glass and the leading edge and the leading portion should be moving at the same, i. e. equivalent, velocity to avoid shearing or other damage to the glass. As seen in FIGS. 5 and 6, the first open valve area 62 is exposed, causing the first vacuum chamber 66 to be evacuated, thereby resulting in the attachment of the glass sheet 10 to the forming area. This attachment occurs because a differential pressure is established between the interior of the first vacuum chamber 66 which applies a vacuum to the first or upper surface 12 of the glass sheet and the second or lower surface 14 of the glass sheet which is subjected to at least atmospheric pressure and, typically, to the increased pressure of a positive flow of air through the porous surface 18. Thus, as shown in FIGS. 6 and 7, initial attachment of the glass sheet to the glass former is achieved.

During the rotation of the glass former 22, as shown in FIGS. 5 to 11, the sliding roof portion 20, and similarly constructed side seals (not shown), of the lehr 16 are kept in close proximity to the surface of the glass former in order to keep the heat in the lehr. This action may be accomplished by counterweighting the sliding roof and side seals in a manner known in the art so that they are biased slightly to positions in close proximity to the surface of the glass former.

Figure 7:
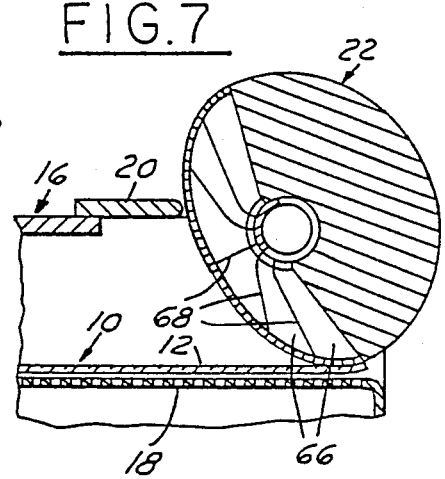

FIG. 7 shows vacuum now applied to two of the vacuum chambers 66—66 of the glass former 22 because of the aforementioned operation of the slide valve 52. In such a manner, concurrent movement of the forming area 50 and the glass sheet 10 is continued so that the entire length of the glass sheet is incrementally moved from its path of conveyance and is attached to and moves with incremental sections defining the forming area 50. This action occurs because of the establishment of a differential gas pressure acting between the forming area engaging the first surface 12 of the glass sheet and the second surface 14 of the glass sheet. The positive pressure of the gas flow through the porous surface 18 of the glass hearth can assist the pickup of the glass sheet by vacuum at the rotating forming surface. This advantage is another reason a gas hearth heating means is preferred.

Figure 8:
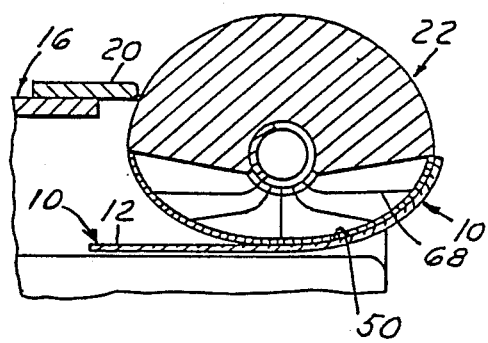
Figure 9:
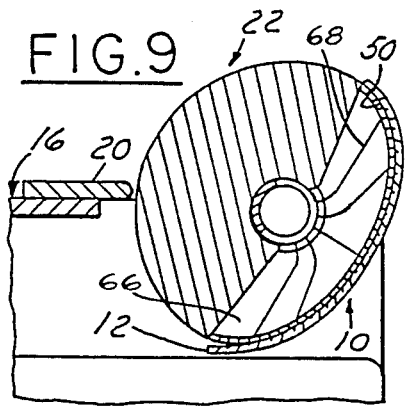

As shown in FIGS. 8 and 9, continued rotation of the glass former 22 causes additional vacuum chambers 66—66 to be connected to the vacuum source so that the glass sheet 10 is picked up and formed by a bending action onto the forming area 50 in a progressive, incremental manner with the forming on the surface being accomplished solely by the application of gas pressure. Since no solid force applying tools are used in the glass forming process according to the illustrated preferred embodiment, the formed glass sheet will not have any tool marks thereon. It will be recognized by the skilled in the art in view of the present disclosure that alternative, less preferred embodiments of the invention may employ glass forming means in adition to such differential fluid pressure. Thus, for example, the glass former may comprise peripheral rings, frames, rollers, clamps, or the like acting simultaneous with or subsequent to the fluid pressure differential to form the glass sheet. In addition, it may be desirable to employ means to control the temperature of the glass sheet such as, for example, cooling bars or heating means, after it has been picked up by the glass former.

As stated above, a differential pressure of between about 10 mm and 100 mm of water gauge is usually sufficient to form the glass on the forming area 50 of the glass former 22. The glass is formable at these pressures when it has been heated to a temperature generally in a range from 600° C. to 640° C. This applies, usually, for glass having a thickness in a range of 3 millimeters or less. Thicker glass sheets typically require more pressure or more bending time, or need to be heated to a higher temperature in order to soften them to a greater extent. The heating and bending schedules and the pressures required to obtain the required forming can be determined or at least closely approximated mathematically by the skilled of the art using generally known heating/cooling rates, conveying speeds, etc. Also, they can be worked out easily by empirical methods such as simply carrying out a few test operations on individual glass sheets to achieve the best forming conditions. The forming condition variables include the differential pressure placed on the glass sheet, the bending or forming time required, and the temperature to which the glass sheet is heated.

In the preferred embodiment of the invention described above the glass sheet is formed with full dimensional control on the forming area of the glass former by the action of differential gas pressure alone. This means that glass sheets will be repeatedly formed to the same accurate dimensional tolerances. This control is achieved because the forming area 50 of the glass former is rigid and remains in the same position time after time of use.

The removing of a formed glass sheet 10 from the forming area 50 of the glass former 22 will best be understood by reference to FIGS. 1, 1A, 10 and 11. In FIGS. 1 and 1A, a glass pickup device, generally designated by the numeral 86, is shown. This device includes a vacuum pickup head 88 having a vacuum line 90 connected thereto so that a vacuum may be drawn on the interior portion of the vacuum pickup head. The face of the vacuum pickup head coming in contact with the glass sheet is porous so that a pressure differential may be applied to pick up a glass sheet. A pair of support arms 92—92 (only one being shown in the drawings) is provided to support and move the vacuum pickup head 88. An upper portion of each of the support arms is pinned at shaft 94 to the vacuum pickup head while a lower portion of each of the support arms is pinned at shaft 96 to a base member 98 for pivotal movement with respect thereto.

The operation of the glass pickup device 86 is as follows. When the forming area 50 of the glass former 22 has formed the glass sheet as desired, the glass former is rotated to the position depicted in FIG. 10 and stopped. It should be noted here that the glass forming process carried out by fluid pressure differential at the rotating surface of the glass former is carried out while the glass is moving and there is no stoppage involved. Thus, an advantage of the present invention occurs in that less time is required in that forming process.

Figure 10:
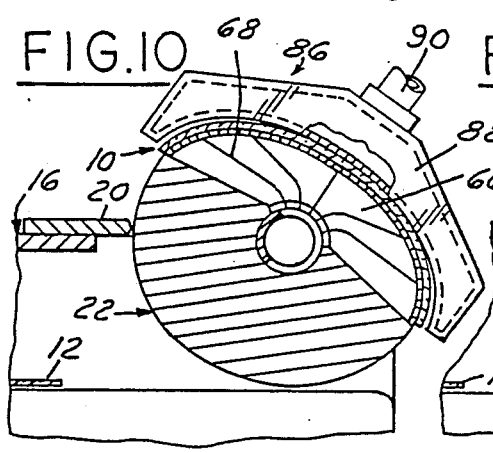
FIGS. 10 and 11 show the transfer of a formed glass sheet from the glass former to a device for removing the glass sheet from the glass former.
Figure 11:
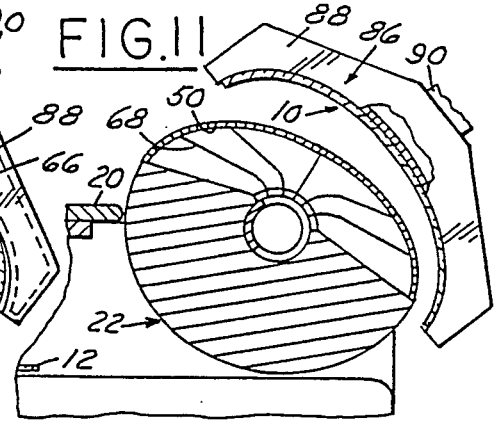
Figure 13:
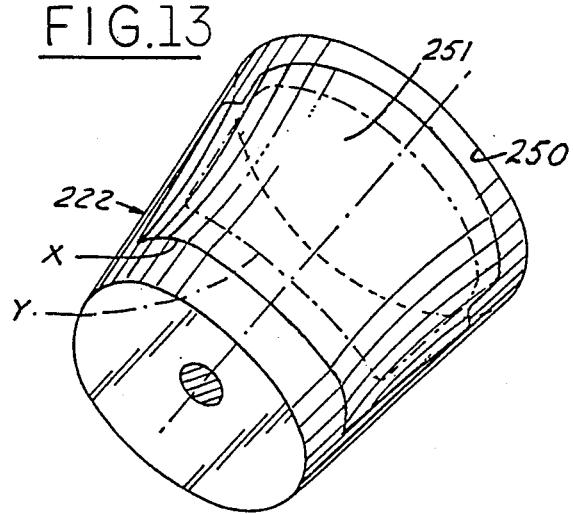
FIG. 13 is an isometric view of the glass former of FIG. 2 and depicted thereon are glass sheets of different sizes which can be formed individually, one at a time.

At the point shown in FIG. 10, the pickup device 86 is moved into its glass pickup position. At this point, vacuum is applied to the vacuum pickup head 88 and concurrently the vacuum is released and slight pressure is supplied to the interior of the glass former 22. Thus, the glass sheet 10 is transferred in its bent condition from the glass former 22 to the glass pickup device 86. The size and configuration of the gap between the glass former and the pickup head should correspond generally to the size and shape of the formed glass sheet. To preserve surface and optical quality, however, the gap should not be such that the glass is compressed between those fixtures.

A pulley 100 is driven by a pulley belt 102 whereby the support arms 92—92 of the glass pickup device are pivoted to the dotted position shown in FIG. 1A. The vacuum pickup head 88, of course, carries the glass sheet 10. A drive chain conveyor, generally designated by the numeral 104 in FIG. 1, is used to carry the formed glass sheet 10 away from the forming operation. This is accomplished by pivoting the glass pickup device 86 to the dotted position shown in FIG. 1. Once in that position, the vacuum is released in the vacuum pickup head 88. The released glass sheet drops a short distance by gravity to rest on the drive chain conveyor. The drive chain conveyor transports the glass sheet to other work stations where additional operations may be carried out thereon. For example, if it is desired to temper the formed glass sheet, the drive chain conveyor may convey the glass sheet 10 directly to a tempering station where the temperature of the glass sheet is reduced at a rapid rate in order to temper the same. The drive chain conveyor may also be a conveyor for transporting the glass sheet through an annealing process in which the glass sheet is slowly cooled under controlled conditions to form an annealed glass product. The vacuum pickup head may be synchronized to the glass former by any of various means known to the skilled of the art. Thus, electrical controls may be used or, more preferably, the components may be mechanically interlocked.

It is a feature and an advantage of this and like preferred embodiments of the invention that a glass sheet is formed and a glass product is produced thereby with dimensional control over its entire surface area without any intermittent or reciprocating motion applied to the glass sheet during its forming process. It is another advantage that a glass sheet can be formed and a glass product produced thereby with dimensional control over its entire surface area without the glass sheet being contacted by peripheral rings or frames during the forming or transportation of the glass sheet.

The invention may be practiced to produce a wide variety of glass products. These products may be either tempered or annealed glass products through the use of peripheral equipment in accordance with additional (separate or integrated) processing steps known to and uunderstood by the skilled of the art.

The invention has particular utility in forming thin glass windshields. Thin glass windshields typically are formed of two sheets of glass, each sheet having a thickness less than about 3 millimeters. As is known by those skilled in the art, two glass ply laminated windshields are formed by bending together an inner glass sheet and an outer glass sheet. Prior to the present invention, the two glass sheets would be uniquely matched to each other, since the bending operation would be carried out on paired glass sheets and would result in a unique shape for each pair of bent glass sheets. Therefore, if one of the pair of bent glass sheets were damaged or broken, the other would be discarded as well.

In accordance with the present invention, however, a glass sheet can be formed with dimensional control over its entire surface area so that glass sheets of identical curvature may be formed one after the other. Thus, the method may be used to first produce the outer glass sheet for a laminated-type windshield, and then subsequently used to produce an inner glass sheet for the laminated-type windshield construction. Because of the dimensional control, any inner glass sheet may be matched with any outer glass sheet in order to form a laminating pair to form a laminated windshield.

Additionally, the invention may be used to form a complex curved thin glass sheet into a particular shape. The thin glass sheet may subsequently be laminated to another glass sheet or be chemically tempered, or be subjected to combinations of those additional processing steps, in order to produce various types of glass products. Thus, precision bent complex glass sheets may be produced for use in automotive, architectural, and industrial applications.

According to alternative preferred embodiments of the invention, a glass sheet is formed having a complex geometric shape commonly called a "saddle shape" or the surface known as a hyperbolic paraboloid with variable dimensions. According to such embodiments, the forming area of the glass former has at least one zone wherein the surface is offset from the curved plane defining the main surface area. Such zone can define either a convexity or, more typically, a concavity. A concavity here means a zone depressed inwardly toward the axis of rotation of the glass former and a convexity is the reverse. The dislocation can be neither so abrupt or sharp nor so large in any direction as to interfere overly with the fluid pressure differential attachment of the glass sheet to the glass former. It will be understood also, in view of this disclosure, that the face of the vacuum pickup head 88 in FIG. 1A must accommodate any convexity present in the glass forming surface of the glass forming (and correspondingly present in the glass sheet). If the glass former 22 in FIG. 1 has a concave zone, the face of the vacuum pickup head should present a corresponding convexity so as to preserve the configuration imparted to the glass sheet by such concave zone. This would be a concern, however, generally only if the glass is still at a forming temperature when transferred to the vacuum pickup head. If the glass temperature is suitable, it may be possible to preserve the glass configuration without the aforesaid corresponding convexity in the face of the pickup head by having the face non-porous in that area, so as not to create a vacuum in that area. Generally, however, it is preferred that the pickup head provide a convexity corresponding to each glass former concavity to achieve better uniformity in the formed glass sheets.

As best seen in FIGS. 12-15, the forming area 250 of the glass former 222 has associated therewith a zone 251 which is depressed inwardly toward the axis of rotation of the glass former. In the preferred embodiment shown, the zone is a single continuous zone of substantial size located generally centrally within the forming area. The number and location of such zone(s) is controlled by the shape one desires in the finished glass product. The proper placement of such zone(s) produces a glass sheet with a desired complex geometry.

As shown in FIG. 14, a portion of the glass sheet 210 is formed into the zone 251 of the forming area 250 by the differential gas pressure discussed above. Formation of the the glass sheet in this zone gives a complex geometric shape to the glass sheet. A formed glass sheet 284, formed in accordance with the teachings of this preferred embodiment of this invention, is shown in FIG. 16. The formed glass sheet 284 is used, as shown in FIG. 17, as a windshield for a motor vehicle 285. The formed glass sheet 284 has a "saddle shape" form as viewed from the exterior of the motor vehicle. The concave curvature of this shape runs generally from the top to the bottom of the formed glass sheet. As has been discussed above, the desired shape of the glass product can be altered by the number, size and location of the zone or zones 251 placed in the forming area 250 of the glass former 222. The glass sheet 210 is transferred in its bent condition from the glass former 222 to the glass pickup device 286. This transfer action is shown in FIG. 15. This figure shows that the pickup device is formed to the shape of the surface of the glass sheet being picked up.

According to yet other preferred embodiments of the invention, secondary forming of the glass sheet is performed by a pickup and forming surface of a secondary glass former brought into contact with the glass sheet after it has been formed on the (primary) glass former. Of course, the glass must be still, or must be brought again to, a forming temperature. The pickup and forming surface of the secondary glass former is sufficiently porous that a differential pressure may be established thereacross when a pressure below atmospheric pressure is applied from an interior surface of the secondary glass former. The pickup and forming surface of the secondary glass former also has at least one concave region, i.e., at least one zone thereon which is depressed inwardly toward the interior thereof. Typically, the secondary glass former can be a modified version of the vacuum pickup head disclosed and described above. Thus, following the principles set forth above regarding operation of the vacuum pickup head, a differential pressure is established across the pickup and forming surface of the secondary glass former. The differential pressure is released across the forming area of the primary glass former (corresponding to glass formers 22 and 222 above), whereby the glass sheet is transferred from the forming area of the primary glass former to the pickup and forming surface of the secondary glass former. The glass sheet can be formed in this way with full dimensional control on the pickup and forming surface of the secondary glass former by the use of differential gas pressure to produce a formed glass sheet having a complex three dimensional bent shape.

In accordance with a preferred embodiment, the secondary glass former then can be moved to a drop off station. At the drop off station, the differential pressure across the pickup and forming surface of the secondary glass former is released so that the completely formed glass sheet is delivered to the drop off station.

An embodiment of the invention, wherein a formed glass sheet is removed from the forming area of the glass former and further formed, is now discussed with reference to FIGS. 18 to 21. In the embodiments discussed above with reference to FIGS. 1 and 1A, glass removal device 86 includes a vacuum pickup head 88 having a vacuum line 90 connected thereto so that a vacuum may be drawn on the interior portion of the vacuum pickup head. In the embodiment of FIGS. 18–20, a secondary glass former 386 corresponds to pickup device 86 discussed above. It differs in that vacuum pickup head 388 has a pickup and forming surface 391, best seen in FIGS. 19 and 20. The vacuum pickup head coming in contact with a glass sheet 310 is porous so that a pressure differential may be applied to pick up and form the glass sheet.

The operation of the secondary glass former 386 is as follows. When the forming area 50 of the primary glass former 22 has formed the glass sheet as desired, the primary glass former is rotated to the position depicted in FIG. 10 and briefly stopped. It should be noted here that the glass forming process carried out on the primary glass former can be (and preferably is) carried out while the glass is moving with no stoppage involved, as discussed above. Thus, this embodiment shares the above noted advantage that less time is required in the forming process carried out on the primary glass former.

At the point shown in FIG. 10, the secondary glass former 386 is moved into its glass pickup position. At this time, vacuum is applied to the vacuum pickup head 388 and concurrently the vacuum is released and slight pressure is supplied to the interior of the primary glass former 22. Thus, the glass sheet 310 is transferred from the primary glass former 22 to the secondary glass former 386. This transfer action is shown best in FIGS. 18 to 20.

FIG. 20 shows that the pickup and forming surface 391 of the secondary glass former 386 has at least one zone 393 thereon which is depressed inwardly toward the interior surface thereof. In the preferred embodiment illustrated, the zone is a single continuous zone of substantial size located generally centrally in the pickup and forming surface. The number, size and location of such zone(s) is controlled by the shape one desires in the finished glass product. The placement of such zone(s) permits production of a three dimensional formed glass sheet with complex geometry.

When the secondary glass former 386 is in the position shown in FIG. 19, a differential pressure is established across the pickup and forming surface 391 of the secondary glass former. The differential pressure is established by drawing a vacuum in the vacuum pickup head 388. At this time the differential pressure is released across the forming area 50 of the primary glass former 22, whereby the glass sheet 310 is transferred from the forming area of the primary glass former 22 to the pickup and forming surface of the secondary glass former 386. The glass sheet can be formed in this way with full dimensional control on the pickup and forming surface of the secondary glass former and by the use of differential gas pressure only to produce a formed glass sheet having a three dimensional bent shape with complex geometry.

As shown in FIG. 20, a portion of the glass sheet is formed into the zone 393 of the pickup and forming surface 391 of the secondary glass former 386 by the differential gas pressure discussed above. Formation of the glass sheet in this zone gives a complex three dimensional form to the glass sheet.

A formed glass sheet with complex geometry, generally identified by the numeral 395 in FIG. 21, formed in accordance with the teachings of the preferred embodiment of FIGS. 18–21, is used as a back lite for a motor vehicle 397. The formed glass sheet has a convex form as viewed from the exterior of the motor vehicle. The convex form runs generally from the top to the bottom of the formed glass sheet. As has been discussed above, the desired shape of the glass product can be altered by the number, size and location of the zone or zones 393 placed in the pickup and forming surface 391 of the secondary glass former 386.

It should be noted that vacuum pickup head 388 has hinge means 399 at its center. It will be apparent to the skilled of the art in view of the present disclosure that the vacuum pickup heads 86 and 286 of above described embodiments also may have such feature. Hinge means 399 allows opening of the pickup head, whereby scuffing of the glass during transfer from the primary glass former by contact with the face of the pickup head can be reduced or entirely avoided.

According to yet other preferred embodiments of the invention, a glass sheet can be formed to have a complex geometric shape commonly referred to as "a complex shape with an S shaped vertical centerline" or the surface known as "a complex three dimensional shape containing the foci of variable curvature on opposite sides of the surface." A preferred such embodiment is described below with reference to FIGS. 22–29. As illustrated therein, glass former 422 defines a forming area 450 over which a glass sheet 410 will be formed into glass sheet product 484. As shown in outline form in FIGS. 22 and 23, glass sheets of substantially different sizes but of similarly curved forms can be formed on the same primary glass former. One such glass shape is generally identified by the letter X and another such glass shape is generally identified by the letter Y. Thus, the glass former may be used to shape different configurations of glass, that is, larger and smaller configurations, so long as the radii of curvature for each glass sheet are the same. If different radii of curvature are required, a different, modified conical drum generally will be required. The primary glass former 422 is designed and constructed as a separate and easily interchangeable unit so that it can be moved easily in and out of position, as were the embodiments described above.

Figure 23:
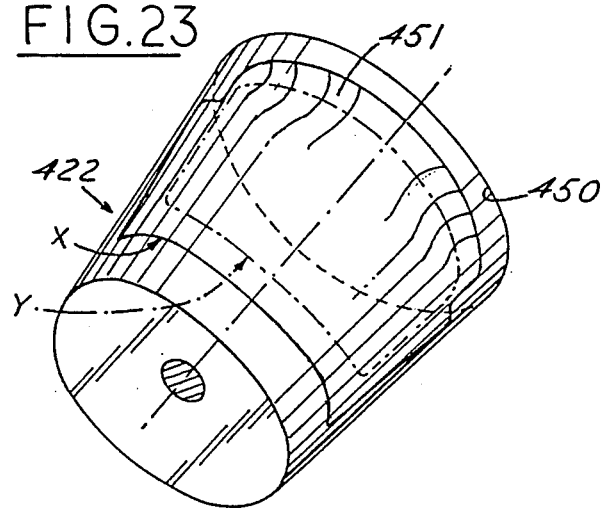
FIG. 23 is an isometric view of the glass former of FIG. 22 with glass sheets of different sizes which can be formed individually, one at a time, on the glass former.
Figure 22:
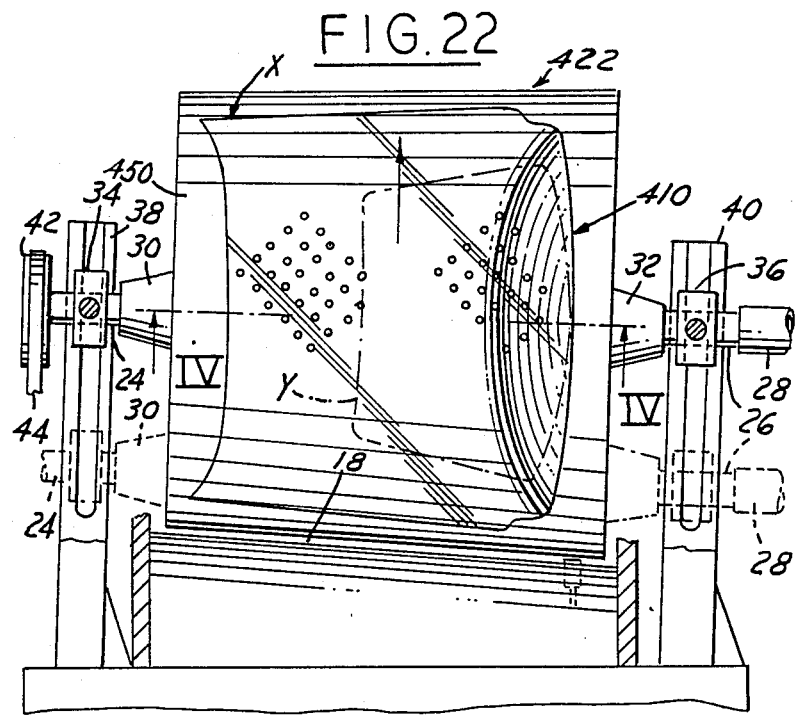
FIG. 22 is an elevation view of a glass former corresponding to that of FIG. 2, but according to another preferred embodiment of the invention, showing in solid lines the formation of a large glass sheet and, as an alternative, in dotted lines, the formation of a smaller glass sheet.
Figure 24:
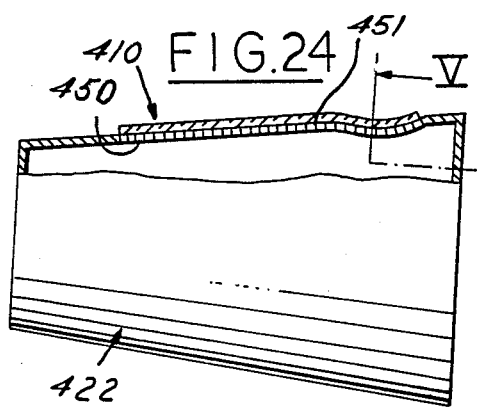
FIG. 24 is an elevation view, partly in cross-section, showing the partial formation of a glass sheet on the glass former of FIG. 22.
Figure 25:
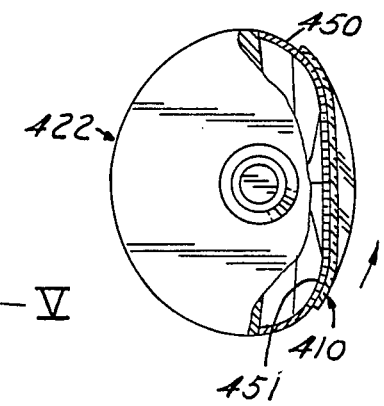
FIG. 25 is an elevation view of the glass former of FIG. 22, partly in cross-section, taken along line V—V of FIG. 24.

As best seen in FIGS. 23, 24 and 25, the forming area 450 of the primary glass former 422 has associated therewith a small, elongated zone 451 which is depressed inwardly toward the axis of rotation of the primary glass former. As in embodiments described above, the surface zone 451 also could be a convexity, rather than a concavity, so long as it did not extend radially outwardly so abruptly or so far that it interfered with the vacuum attachment of the glass sheet to the forming surface. In the preferred embodiment, the zone 451 is a single, elongated concave zone which is narrow in width and located near one of the edges of the forming area. The number, size and location of such zone(s) is controlled by the shape one desires in the finished glass product. The placement of such zone(s) produces a complex geometric shape in a formed glass sheet.

The forming area 450 of the glass former 422 is porous. In this manner, a differential pressure may be applied across the forming area 450 by the establishment of a vacuum in the interior of the primary glass former 422. The vacuum is established by drawing a vacuum on vacuum line 28 which in turn results in a vacuum being drawn on hollow shaft 26, the hollow trunnion 32, and the interior of a slide valve 52, which corresponds to those elements of the embodiment shown in FIGS. 5 through 11. The slide valve operates in accordance with principles described above. As shown in FIGS. 24 and 25, a small portion of the glass sheet 410 is formed into the zone 451 of the forming area 450 by the differential as pressure. Formation of the glass sheet in this zone means that the formed glass sheet will have a first area of three dimensional shape bent in a first direction. This is the first bend made to achieve a finished product having an "S" shape profile along some sections.

Figure 26:
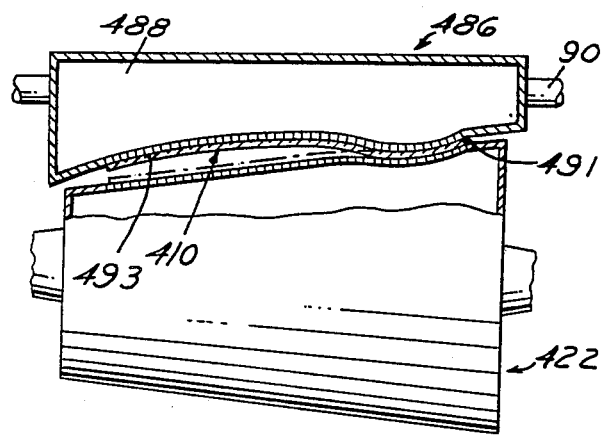
FIG. 26 is an enlarged elevation view of a glass pickup device adapted to be a secondary glass former, shown in a position after it has picked up a partially formed glass sheet from the glass former of FIGS. 22-25 for additional forming and transfer, and showing a cross-section of the secondary glass former near the center of the glass sheet or wherever an "S" shaped profile is desired in the glass sheet formed thereby.
Figure 27:
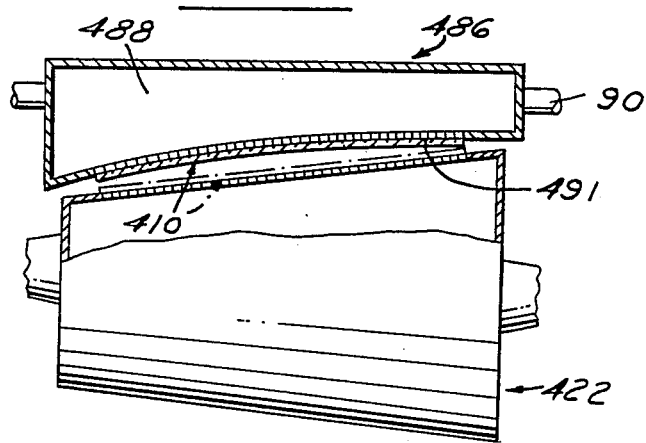
FIG. 27 is an enlarged elevation view of the secondary glass former of FIG. 26 showing a cross-section of the secondary glass former near an edge of the glass sheet, or wherever a uniformly curved profile is desired in the glass sheet formed thereby.

The further forming and removing of a formed glass sheet 410 from the forming area 450 of the primary glass former 422 will best be understood by reference to FIGS. 26 and 27. In the embodiment of FIGS. 26 and 27 (as in the embodiment of FIGS. 18-20) a secondary glass former 486 corresponds to pickup device 86 of FIGS. 1 and 1A. Vacuum pickup head 480 has a vacuum line 490 connected thereto so that a vacuum may be drawn on the interior portion of the vacuum pickup head. A pickup and forming surface 491 of the vacuum pickup head comes in contact with the glass sheet 410 and is porous so that a pressure differential may be applied to pick up and form the glass sheet.

The operation of the secondary glass former 486 is as follows. When the forming area 450 of the primary glass former 422 has formed the glass sheet as desired, the primary glass former is rotated to a position corresponding to that depicted in FIG. 10 and stopped for a brief period of time. It should be noted here that the glass forming process can be carried out on the primary glass former while the glass is moving without stopping involved. Thus, this embodiment shares the aforesaid advantage that less time is required in the forming process carried out on the primary glass former.

At the point corresponding to that of FIG. 10, the secondary glass former 486 is moved into its glass pick up position. At this time, vacuum is applied to the vacuum pickup head 488 and concurrently the vacuum is released and slight pressure can be supplied to the interior of the primary glass former 422. Thus, the glass sheet 410 is transferred from the primary glass former 422 to the secondary glass former 486.

FIG. 26 shows that the pickup and forming surface 491 of the secondary glass former 486 has at least one zone 493 thereon which is depressed inwardly toward the interior surface thereof. As described above, the surface 491 may comprise of a convexity in addition to or in lieu of concavity 493. Any such convexity(ies) should not extend outwardly from surface 491 so far or so abruptly as to interfere with the vacuum pick up and forming of glass sheet 410. Also, the surface 450 of the primary glass former would have to provide a corresponding concavity to receive the convexity of surface 491. In that case, of course, the surface of such concavity in the primary glass former preferably would be in communication with the aforesaid source of reduced pressure, whereby the desired glass formation in that zone already would have been achieved by the time vacuum pickup head 488 took the glass sheet from the primary glass former.

In the preferred embodiment of FIGS. 26 and 27, the zone 493 is a single continuous zone of substantial size located generally centrally in the pickup and forming surface. The number, size and location of such zone(s) is controlled by the shape one desires in the finished glass product. The proper placement of such zone(s) can produce a formed glass sheet having an "S" shaped cross-section.

When the secondary glass former 486 is in the position shown in FIG. 10, a differential pressure is established across the pickup and forming surface 491 of the secondary glass former. The differential pressure is established by drawing a vacuum on the vacuum pickup head 488. At this time the differential prssure is released across the forming area 450 of the primary glass former 422, whereby the glass sheet 410 is transferred from the forming area of the primary glass former to the pickup and forming surface of the secondary glass former. The glass sheet is thereby formed with full dimensional control on the pickup and forming surface of the secondary glass former by the use of differential gas pressure only to produce a completely formed glass sheet having a second area of three dimensional bent shape thereon in a direction away from the aforesaid first direction, so that the formed glass sheet has an "S" shaped profile along some sections.

As shown in FIG. 27, the edges of the glass sheet 410 are not necessarily formed into a convex or concave zone. Thus, the edges of the formed glass sheet 484 may or may not have an "S" shaped vertical cross section in the preferred embodiment.

Figure 28:
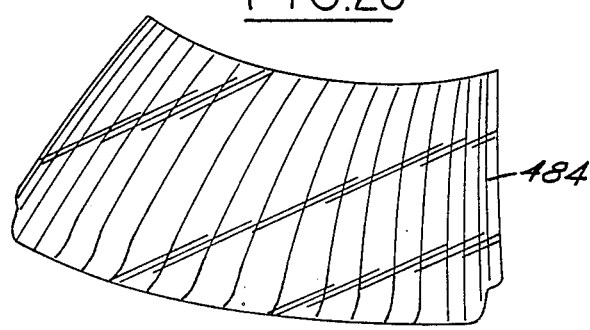
FIG. 28 is an isometric view of a glass sheet formed according to the embodiment of FIGS. 22-27, having an "S" shape cross-section along its center line.
Figure 29:
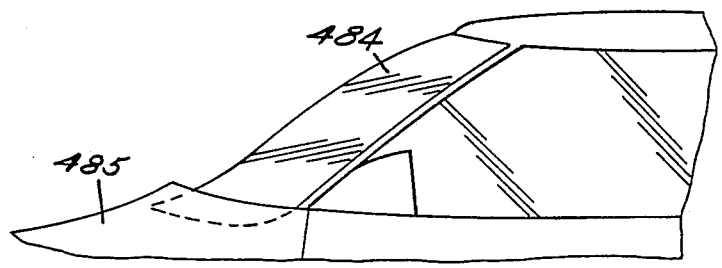
FIG. 29 is a partial elevation view of the glass sheet of FIG. 28 installed as a windshield in a motor vehicle.

A formed glass sheet 484, formed in accordance with preferred embodiment of FIGS. 22-27 is shown in FIGS. 28 and 29. The formed glass sheet 484 is used, as shown in FIG. 29, as a windshield for a motor vehicle 485. The formed glass sheet has an "S" shaped cross section through its vertical centerline. As viewed from the exterior of the vehicle, the top part of the windshield is convex while the bottom part of the windshield is concave. As has been discussed above, the desired shape of the glass product can be altered by the number, size and location of the deflection zone or zones placed in the forming area of the primary glass former and the number, size and location of the deflection zone or zones of the forming surface of the secondary glass former.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of forming a glass sheet from a first condition into a second condition, said glass sheet having a selected thickness with first and second surfaces and having a selected peripheral configuration defining a peripheral edge, which forming method comprises the steps of:

heating said glass sheet to a temperature at which said glass sheet is formable from said first condition to said second condition;

conveying said heated glass sheet by conveying means at a selected velocity along a path of travel to a forming station comprising a rotatable glass former including means defining an outer peripheral forming surface having at least a portion thereof with a defined shape substantially corresponding to said second condition of said glass sheet, said outer peripheral forming surface being in communication with a source of reduced pressure, wherein a leading edge of said glass sheet is brought into registered contact with a leading portion of said peripheral forming surface while said peripheral forming surface is being rotated by rotating means about an axis substantially transverse to said path of travel at a peripheral velocity substantially equivalent to said selected velocity; and progressively moving said first surface into close proximity with said defined shape portion of said outer peripheral forming surface, said glass sheet there being transformed into said second condition at least in part by external fluid pressure acting against said second surface while reduced pressure acts against said first surface and while said peripheral forming surface continues rotating.

2. The method of claim 1 wherein said surface is progressively moved into close proximity with said defined shape portion of said outer peripheral forming surface by cooperation of said conveying means, said rotating means and said reduced pressure source.

3. A method of forming a glass sheet with dimensional control over the entire surface area thereof, said glass sheet being elongated and having first and second surfaces separated from one another, which forming method comprises the steps of:

heating said glass sheet to a temperature at which said glass sheet is formable by application of different gas pressures on said first and said second surfaces thereof;

conveying said heated glass sheet on a path towards a forming area over which said heated glass sheet will be formed, said forming area being both (i) located on a curved surface formed on a portion of an exterior surface of a rotatable glass former, and (ii) moving on an arcuate path about an axis of rotation of said glass former, said portion of said glass former defining said forming area being sufficiently porous that a differential pressure may be established thereacross when a reduced pressure is applied from an interior surface of said portion of said glass former;

establishing a differential pressure across said forming area;

bringing a leading edge of said first surface of said heated glass sheet and a leading portion of said forming area into registered contact with one another while both said aforementioned leading edge and said aforementioned leading portion are moving at the same velocity, attachment of said glass sheet to said forming area being initiated because a differential pressure is established between a portion of said forming area which engages said first surface of said glass sheet and said second surface of said glass sheet; and continuing concurrent movement of said forming area and said glass sheet so that said entire length of said glass sheet is incrementally moved from its path of conveyance and is attached to and moves with incremental sections of said forming area because of said differential gas pressure gradient established and maintained between said forming area engaging said first surface of said glass sheet and gas pressure acting on said second surface of said glass sheet, whereby said glass sheet is formed with full dimensional control on said forming area of said glass former by the use of differential gas pressure only.

4. The method of forming a glass sheet according to claim 3, wherein said curved surface of said rotatable glass former is a modified conical surface.

5. The method of forming a glass sheet according to claim 4, further comprising:

terminating rotation of said glass former when said glass sheet has been completely formed on said forming area thereof by said action of said differential gas pressure; and removing said formed glass sheet from said glass former.

6. A method of forming a glass sheet into a complex geometric shape with dimensional control over the entire surface area thereof, said glass sheet being elongated and having first and second surfaces separated from one another, which forming method comprises the steps of:

heating said glass sheet to a temperature at which said glass sheet is formable by application of different gas pressures on said first and said second surfaces thereof;

conveying said heated glass sheet on a path towards a forming area over which said heated glass sheet will be formed, said forming area being both (i) located on a curved surface formed on a portion of an exterior surface of a rotatable glass former, and (ii) moving on an arcuate path about an axis of rotation of said glass former, said portion of said glass former defining said forming area having at least one zone thereon depressed inwardly toward the axis of rotation of said glass former, said portion of said glass former defining said forming area also being sufficiently porous that a differential pressure may be established thereacross when a reduced pressure is applied from an interior surface of said portion of said glass former;

establishing a differential pressure across said forming area;

bringing a leading edge of said first surface of said heated glass sheet and a leading portion of said forming area into registered contact with one another while both said aforementioned leading edge and said aforementioned leading portion are moving at the same velocity, attachment of said glass sheet to said forming area being initiated because a differential pressure is established between a portion of said forming area which engages said first surface of said glass sheet and said ssecond surface of said glass sheet; and continuing concurrent movement of said forming area and said glass sheet so that said entire length of said glass sheet is incrementally moved from its path of conveyance and is attached to and moves with incremental sections of said forming area because of said differential gas pressure gradient established and maintained between said forming area engaging said first surface of said glass sheet and gas pressure acting on said second surface of said glass sheet, whereby said glass sheet is formed with full dimensional control on said forming area of said glass former by the use of differential gas pressure only to produce a formed glass sheet having a complex geometric shape.

7. The method of forming a glass sheet according to claim 6, wherein said curved surface of said rotatable glass former is a modified conical surface.

8. The method of forming a glass sheet according to claim 7, further comprising:

terminating rotation of said glass former when said glass sheet has been completely formed on said forming area thereof by said action of said differential gas pressure; and removing said formed glass sheet from said glass former to produce a formed glass sheet having a complex geometric shape.

9. A method of forming a glass sheet into a complex geometric shape with dimensional control over he entire surface area thereof, said glass sheet being elongated and having first and second surfaces separated from one another, which forming method comprises the steps of:

heating said glass sheet to a temperature at which said glass sheet is formable by application of different gas pressures on said first and said second surfaces thereof;

conveying said heated glass sheet on a path towards a forming area over which said heated glass sheet will be formed, said forming area being both (i) located on a curved surface formed on a portion of an exterior surface of a rotatable primary glass former, and (ii) moving on an arcuate path about an axis of rotation of said primary glass former, said portion of said primary glass former defining said forming area being sufficiently porous so that a differential pressure may be established thereacross when a reduced pressure is applied from an interior surface of said portion of said primary glass former;

establishing a defferential pressure across said forming area;

bringing a leading edge of said first surface of said heated glass sheet and a leading portion of said forming area into registered contact with one another while both said aforementioned leading edge and said aforementioned leading portion are moving at the same velocity, attachment of said glass sheet to said forming area being initiated because a differential pressure is established between a portion of said forming area which engages said first surface of said glass sheet and said second surface of said glass sheet;

continuing concurrent movement of said forming area and said glass sheet so that said entire length of said glass sheet is incrementally moved from its path of conveyance and is attached to and moves with incremental sections of said forming area because of said differential gas pressure gradient established and maintained between said forming area engaging said first surface of said glass sheet and gas pressure acting on said second surface of said glass sheet, whereby said glass sheet is formed with full dimensional control on said forming area of said primary glass former by the use of differential gas pressure only;

terminating rotation of said primary glass former when said glass sheet has been formed on said forming area thereof by said action of said differential gas pressure;

bringing a pickup and forming surface of a secondary glass former into contact with said glass sheet which has been formed on said primary glass former, said pickup and forming surface of said secondary glass former being sufficiently porous so that a differential pressure may be established thereacross when a pressure below atmospheric pressure is applied from an interior surface of said secondary glass former, said pickup and forming surface of said secondary glass former also having at least one zone thereon depressed inwardly towards said interior surface thereof;

establishing a differential pressure across said pickup and forming surface of said secondary glass former; and releasing said differential pressure across said forming area of said primary glass former whereby said glass sheet is transferred from said forming area of said primary glass former to said pickup and forming surface of said secondary glass former, said glass sheet also being formed with full dimensional control on said pickup and forming surface of said secondary glass former by the use of differential gas pressure only to produce a formed glass sheet having a complex geometric shape.

10. The method of forming a glass sheet according to claim 9, wherein said curved surface of said rotatable primary glass former is a modified conical surface.

11. The method of forming a glass sheet according to claim 10, further comprising:

moving said secondary glass former to a drop off station; and releasing said differential pressure across said pickup and forming surface of said secondary glass former so that said completely formed glass sheet is delivered to the drop off station.

12. A method of forming a glass sheet into a complex geometric shape with an "S" shaped cross-section and with dimensional control over the entire surface area thereof, said glass sheet being elongated and having first and second surfaces separated from one another, which forming method comprises the steps of:

heating said glass sheet to a temperature at which said glass sheet is formable by application of different gas pressures on said first and said second surfaces thereof;

conveying said heated glass sheet on a path towards a forming area over which said heated glass sheet will be formed, said forming area being both (i) located on a curved surface formed on a portion of an exterior surface of a rotatable primary glass former, and (ii) moving on an arcuate path about an axis of rotation of said primary glass former, said portion of said primary glass former defining said forming area having at least one zone thereon depressed inwardly toward the axis of rotation of said primary glass former, said portion of said primary glass former defining said forming area also being sufficiently porous so that a differential pressure may be established thereacross when a reduced pressure is applied from an interior surface of said portion of said primary glass former;

establishing a differential pressure across said forming area;

bringing a leading edge of said first surface of said heated glass sheet and a leading portion of said forming area into registered contact with one another while both said aforementioned leading edge and said aforementioned leading portion are moiing at the same velocity, attachment of said glass sheet to said forming area being initiated because a differential pressure is established between a portion of said forming area which engages said first surface of said glass sheet and said second surface of said glass sheet;

continuing concurrent movement of said forming area and said glass sheet so that said entire length of said glass sheet is incrementally moved from its path of conveyance and is attached to and moves with incremental sections of said forming area because of said differential gas pressure gradient established and maintained between said forming area engaging said first surface of said glass sheet and gas pressure acting on said second surface of said glass sheet, whereby said glass sheet is formed with full dimensional control on said forming area of said primary glass former by the use of differential gas pressure only to produce a formed glass sheet having a first area of three dimensional bent shape thereon in one direction;

terminating rotation of said primary glass former when said glass sheet has been formed on said forming area thereof by said action of said differential gas pressure;

bringing a pickup and forming surface of a secondary glass former into contact with said glass sheet which has been formed on said primary glass former, said pickup and forming surface of said secondary glass former being sufficiently porous so that a differential pressure may be established thereacross when a pressure below atmospheric pressure is applied from an interior surface of said secondary glass former, said pickup and forming surface of said secondary glass former also having at least one zone thereon depressed inwardly toward said interior surface thereof;

establishing a differential pressure across said pickup and forming surface of said secondary glass former; and releasing said differential pressure across said forming area of said primary glass former whereby said glass sheet is transferred from said forming area of said primary glass former to said pickup and forming surface of said secondary glass former, said glass sheet also being formed with full dimensional control on said pickup and forming surface of said secondary glass former by the use of differential gas pressure only to produce a completely formed glass sheet having a second area of three dimensional bent shape thereon in a second direction away from said first direction whereby said formed glass sheet will have an "S" shaped cross section.

13. The method of forming a glass sheet according to claim 12, wherein said curved surface of said rotatable primary glass former is a modified conical surface.

14. The method of forming a glass sheet according to claim 13, further comprising:
moving said secondary glass former to a drop-off station; and
releasing said differential pressure across said pickup and forming surface of said secondary glass former so that said completely formed glass sheet is delivered to the drop-off station.

15. Apparatus for forming a glass sheet from a first condition into a second condition, said glass sheet having a selected thickness with first and second surfaces and having a selected peripheral configuration defining a peripheral edge, said apparatus comprising, in combination, means for conveying said glass sheet at a selected velocity along a path of travel from a first position to a second position, said peripheral edge on said glass sheet having a leading edge portion when moving along said path of travel, means for treating said glass sheet, while being conveyed, so as to be formable while at said second position, means at said second position for forming said glass sheet into said second condition, said forming means including means defining an outer peripheral surface having at least a portion thereof with a defined shape substantially equivalent to said second condition of said glass sheet, means for rotating said outer peripheral surface about an axis transverse to said path of travel and at a peripheral velocity substantially equivalent to said selected velocity of said conveying means, said peripheral surface having a leading position during rotation, said conveying means conveying said leading edge portion of said glass sheet into registered contact with said leading position of said peripheral surface, said forming means including means communicating with a reduced fluid pressure source and with said defined shape portion of said peripheral surface for causing said glass sheet to transfer along said first surface from said conveying means to said defined shape portion from external pressure acting against said second surface while said reduced fluid pressure source acts against said first surface, said conveying means, said rotating means, and said reduced pressure cooperating for progressively moving said first surface into close proximity with said defined shape portion of said outer peripheral surface, said glass sheet being formed into said second condition while on said defined shape portion and while said forming means continues rotation.

16. The apparatus of claim 15, wherein means are provided for removing said glass sheet from said defined shaped portion after said glass sheet is completely in said second condition.

17. The apparatus of claim 15, wherein said forming means includes means for terminating the communication of reduced pressure with said glass sheet while said glass sheet is in said second condition and while on said defined shape portion, and means are provided for removing said glass sheet from said defined shape portion after said glass sheet is completely in said second condition.

18. The apparatus of claim 17, wherein said means for removing said glass sheet comprises a reciprocating pickup head with a working face which can be positioned adjacent said glass sheet, said working face having a configuration corresponding to that of said glass sheet in said second condition and being in communication with a source of reduced fluid pressure for causing said glass sheet in said second condition to transfer to said pickup head from said forming means.

19. The apparatus of claim 18, wherein said pickup head further comprises hinge means for enlarging an opening dimension of said working face prior to its being positioned adjacent said glass sheet and then reducing said dimension of said working face.

20. The apparatus of claim 18, wherein said working face has at least one concave zone.

21. The apparatus of claim 15, wherein said defined shape is approximately at least a portion of an conical surface.

22. The apparatus of claim 20, wherein said defined shape has at least one concave zone.

23. Apparatus for forming a substantially flat glass sheet into a windshield of a selected shape, said glass sheet having a selected thickness with first and second surfaces and having a selected peripheral configuration defining a peripheral edge, said apparatus comprising in combination, a frame, means on said frame for conveying said substantially flat glass sheet at a selected velocity along a path of travel, rrom a first position to a second position, said peripheral edge on said substantially flat glass sheet having a leading edge portion while moving along said path of travel, means for heating said glass sheet into a formable state so as to be formable while at said second position, means on said frame and at said second position for forming said glass sheet into said selected windshield shape, said forming means including an outer peripheral surface with a defined shape substantially equivalent to said windshield shape, means for rotating said outer peripheral surface about an axis transverse to said path of travel and at a peripheral velocity substantially equivalent to said selected velocity of said conveying means, said peripheral surface having a leading area defined thereon during rotation, said conveying means conveying said leading edge portion of said substantially flat glass sheet into registered contact with said leading area of said peripheral surface of said forming means, a vacuum source communicating with said defined shape portion and with said first surface of said glass sheet for causing said glass sheet to transfer along said first surface from said conveying means to said defined shape portion of said peripheral surface of said forming means, said transfer resulting from fluid pressure acting against said second surface while said vacuum source acts against said first surface, said conveying means, said rotating means and said vacuum source cooperating for progressively attaching said first surface of said glass sheet to said defined shape portion of said outer peripheral surface, said glass sheet being formed into said selected windshield shape while on said defined shape portion and while said forming means and said peripheral surface continue rotation.

24. The apparatus of claim 23, wherein means are provided for removing said glass sheet from said defined shaped portion after said glass sheet is completely in said selected windshield shape.

25. The apparatus of claim 23, wherein said forming means includes means for terminating the communication of said vacuum source with said glass sheet while said glass sheet is in said selected windshield shape and while on said defined shape portion, and means are provided for removing said glass sheet from said defined shape portion after said glass sheet is completely in said selected windshield shape.

* * * * *